(12) United States Patent
Nichols (10) Patent No.: US 12,530,341 B2
(45) Date of Patent: Jan. 20, 2026

(54) COMPUTER-AUTOMATED SMART DATA ROOM

(71) Applicant: StartOS Inc., New Providence, NJ (US)

(72) Inventor: Jason Nichols, New Providence, NJ (US)

(73) Assignee: StartOS Inc., New Providence, NJ (US)

( * ) Notice: Subject to any disclaimer, the term of this patent is extended or adjusted under 35 U.S.C. 154(b) by 0 days.

(21) Appl. No.: 18/798,344

(22) Filed: Aug. 8, 2024

(65) Prior Publication Data

US 2026/0010528 A1   Jan. 8, 2026

Related U.S. Application Data

(60) Provisional application No. 63/668,745, filed on Jul. 8, 2024.

(51) Int. Cl.
G06F 16/23 (2019.01)
G06F 16/14 (2019.01)

(52) U.S. Cl.
CPC ........ G06F 16/2365 (2019.01); G06F 16/148 (2019.01)

(58) Field of Classification Search
CPC ............................ G06F 16/148; G06F 16/2365
(Continued)

(56) References Cited

U.S. PATENT DOCUMENTS 7,503,035 B2    3/2009  Zeidman
7,921,125 B1 *  4/2011  Houriet, Jr. ............ G16H 10/20
                                                       707/754
(Continued)

FOREIGN PATENT DOCUMENTS

CN    1610300 A    4/2005
CN    108446540    8/2018
(Continued)

OTHER PUBLICATIONS

Bergman, Adam. "Automatic Detection of Source Code Plagiarism in Programming Courses." (2021).
(Continued)

*Primary Examiner* — Robert W Beausoliel, Jr.
*Assistant Examiner* — Lauren Zannah Ganger
(74) *Attorney, Agent, or Firm* — Blueshift IP; Robert Plotkin (57) ABSTRACT

A data management system, also referred to as a "smart data room," streamlines the process of requesting, collecting, and analyzing data through a structured Data Request List (DRL). The system facilitates interactions between requestors and respondents via an automated platform that supports the creation, submission, and review of data requests and responses. Key features include the ability to save and reuse DRLs and responses as templates, real-time notifications for tracking response progress, secure data deletion upon request, and advanced data validation using machine learning techniques to ensure the relevance and adequacy of the information collected. Additionally, the system offers capabilities for conducting live interviews using a real-time avatar, with responses being recorded and analyzed for relevance and adequacy. The system enhances data integrity and efficiency in data collection processes, making it particularly useful in environments where accurate and timely data collection is critical.

20 Claims, 2 Drawing Sheets

(58) Field of Classification Search
USPC .......................................................... 707/690
See application file for complete search history.

(56) References Cited

U.S. PATENT DOCUMENTS

| | | | |
|---|---|---|---|
| 9,003,366 | B2 | 4/2015 | Zeidman |
| 10,320,757 | B1 | 6/2019 | Secker-Walker |
| 12,135,818 | B1 * | 11/2024 | Peruzzi .................. G16H 40/67 |
| 2005/0192821 | A1 | 9/2005 | Goon |
| 2014/0013242 | A1 | 1/2014 | Beresford-Wood |
| 2021/0201013 | A1 | 7/2021 | Makhija |
| 2022/0245594 | A1 | 8/2022 | Baid |
| 2023/0119881 | A1 | 4/2023 | Makhija |
| 2023/0274361 | A1 * | 8/2023 | McCormack .......... G06Q 40/06 705/36 R |
| 2024/0013327 | A1 * | 1/2024 | Raffoul .............. G06Q 10/0631 |

FOREIGN PATENT DOCUMENTS

| | | |
|---|---|---|
| CN | 109165040 | 1/2019 |
| CN | 110471835 | 11/2019 |
| CN | 112394973 | 2/2021 |
| CN | 116738963 | 9/2023 |
| KR | 20210082885 | 7/2021 |
| WO | 2015116082 A1 | 8/2015 |

OTHER PUBLICATIONS

Cosma, Georgina, and Mike Joy. "An approach to source-code plagiarism detection and investigation using latent semantic analysis." Jul. 2008. 310 pages.

Ebrahim, Fahad, and Mike Joy. "Semantic Similarity Search for Source Code Plagiarism Detection: An Exploratory Study." Proceedings of the 2024 on Innovation and Technology in Computer Science Education V. 1. 2024. 360-366.

Gandhi, Nandini, Kaushik Gopalan, and Prajish Prasad. "A Support Vector Machine based approach for plagiarism detection in Python code submissions in undergraduate settings." Frontiers in Computer Science 6 (2024): 1393723.

Malakhoff; Towards Usage of Avatar Interviewers in Web Surveys, May 31, 2011. 23 pages.

Virtual Data Room Features—AI Powered Data Rooms, Ansarada, 13 pages.

* cited by examiner

COMPUTER-AUTOMATED SMART DATA ROOM

CROSS-REFERENCE TO RELATED APPLICATIONS

This application claims priority to U.S. Prov. Pat. App. No. 63/668,745, entitled "Computer-Automated Smart Data Room," filed on Jul. 8, 2024, which is hereby incorporated by reference herein.

BACKGROUND

A data room is a secure space used for storing, managing, and sharing data and documents, typically during complex transactions such as mergers and acquisitions, legal proceedings, financial audits, loan applications, and tax filings, among others. The primary purpose of a data room is to facilitate the efficient and secure exchange of information between various stakeholders, ensuring that all parties have controlled access to necessary documents. Data rooms can be physical rooms or virtual platforms, with the latter becoming increasingly prevalent due to advancements in technology and the need for remote accessibility.

Despite their utility, existing data rooms, particularly traditional physical data rooms, face several challenges:

Limited Accessibility: Physical data rooms require the physical presence of stakeholders to access documents, which can be inconvenient and time-consuming, especially for international transactions.

Security Risks: While virtual data rooms offer improved accessibility, they also introduce security concerns such as data breaches and unauthorized access, especially if not properly managed.

Inefficient Document Management: Managing large volumes of documents, especially in a format that stakeholders can easily navigate, is often cumbersome. Traditional data rooms may lack efficient indexing and search tools, making document retrieval slow and difficult.

Version Control Issues: In scenarios involving multiple revisions of documents, maintaining the latest versions and tracking historical changes can be challenging, leading to potential discrepancies and misunderstandings.

Language Barriers: In global transactions, the need to handle documents in multiple languages can complicate communication and increase the risk of errors.

Compliance and Regulatory Challenges: Ensuring that data handling practices comply with various international laws and regulations, such as GDPR or HIPAA, can be complex and resource-intensive.

Given these challenges, there is a clear and pressing need for improved data room solutions that enhance accessibility, security, and efficiency, while also addressing the specific needs of diverse and global stakeholders. Such improvements would significantly streamline the process of data exchange and management, reduce risks associated with data handling, and ensure compliance with regulatory standards. This need underscores the importance of developing innovative approaches to overcome the limitations of current data room technologies.

SUMMARY

A data management system, also referred to as a "smart data room," streamlines the process of requesting, collecting, and analyzing data through a structured Data Request List (DRL). The system facilitates interactions between requestors and respondents via an automated platform that supports the creation, submission, and review of data requests and responses. Key features include the ability to save and reuse DRLs and responses as templates, real-time notifications for tracking response progress, secure data deletion upon request, and advanced data validation using machine learning techniques to ensure the relevance and adequacy of the information collected. Additionally, the system offers capabilities for conducting live interviews using a real-time avatar, with responses being recorded and analyzed for relevance and adequacy. The system enhances data integrity and efficiency in data collection processes, making it particularly useful in environments where accurate and timely data collection is critical.

Other features and advantages of various aspects and embodiments of the present invention will become apparent from the following description and from the claims.

DETAILED DESCRIPTION

Figure 1:
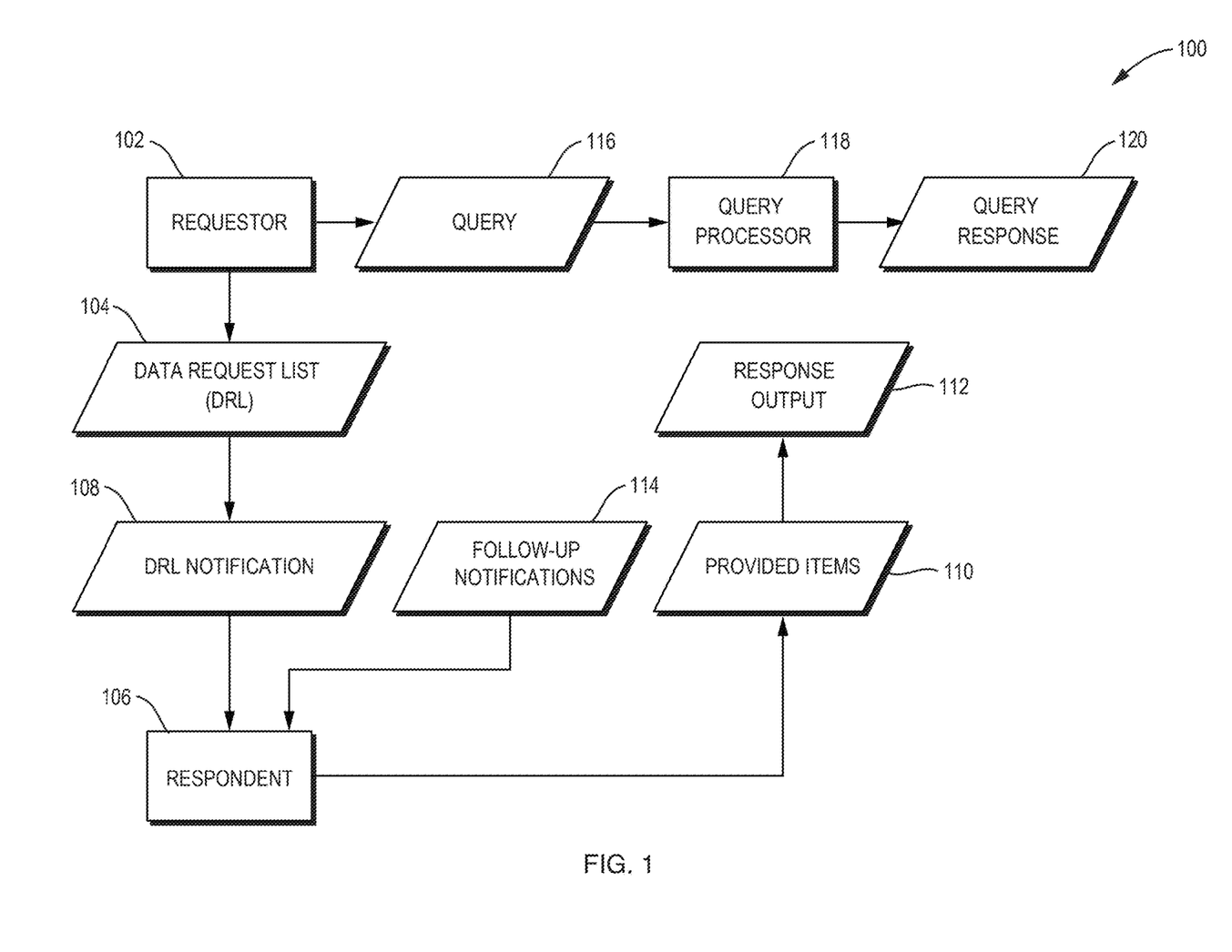
FIG. 1 is a dataflow diagram of a system for implementing a smart data room according to one embodiment of the present invention.
Figure 2:
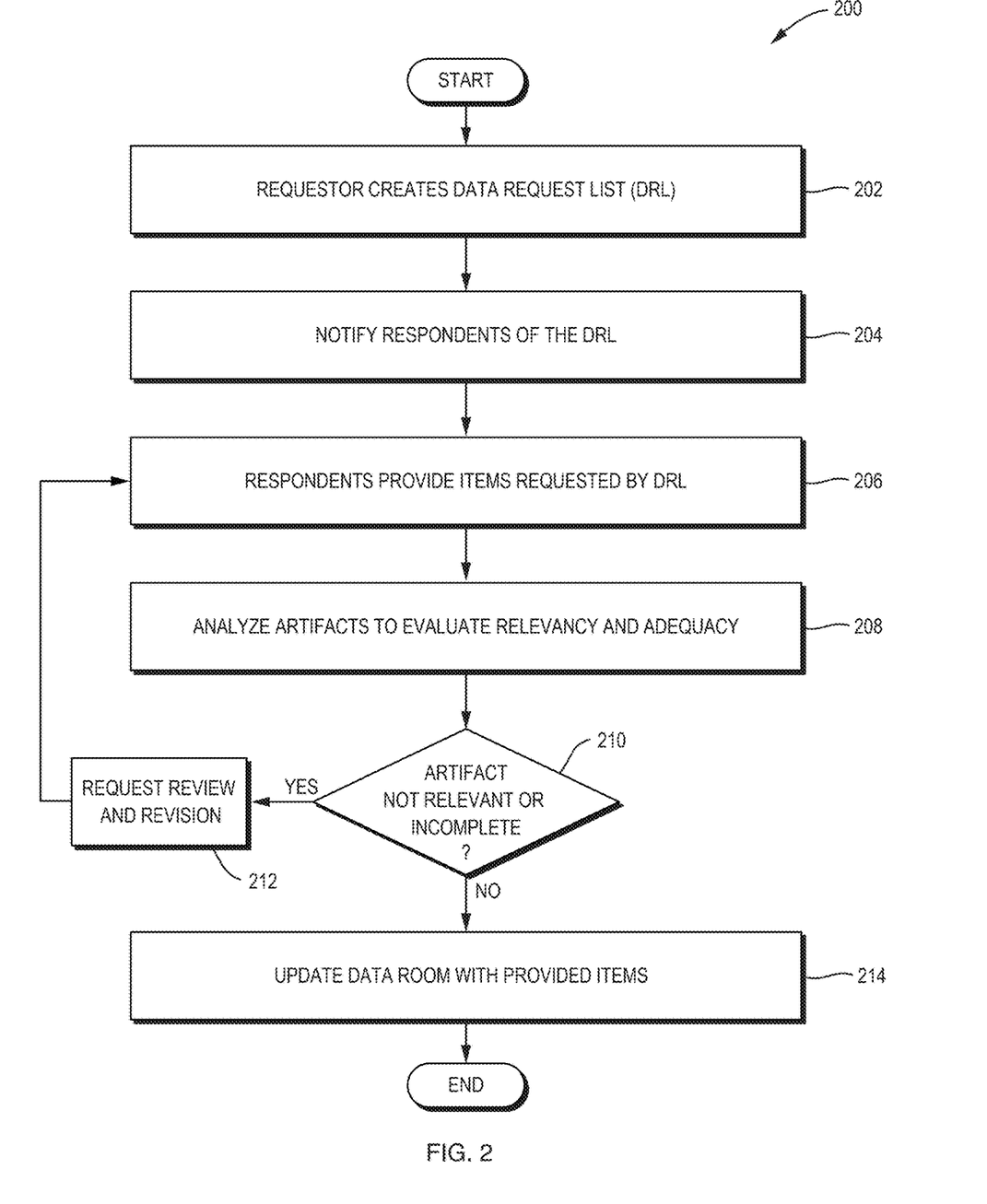
FIG. 2 is a flowchart of a method performed by the system according to one embodiment of the present invention.

Referring to FIG. 1, a dataflow diagram is shown of a system 100 for implementing a smart data room according to one embodiment of the present invention. Referring to FIG. 2, a flowchart is shown of a method 200 performed by the system 100 according to one embodiment of the present invention.

The system 100 includes a requestor 102, which creates a list of request items that is also referred to herein as a Data Request List (DRL) 104. The DRL 104 is a structured compilation of specific items or data points that the requestor needs or desires to collect from one or more respondents 106. The purpose of the DRL 104 is to clearly outline and organize the data requirements of a transaction or process, ensuring that all necessary information is requested and provided in a systematic manner. The DRL 104 serves as a central reference point for both the requestor 102 and respondents 106, facilitating a streamlined process for data submission and retrieval. (Although respondents 106 are referred to herein in the plural, the respondents 106 may include one or more respondents.) Each request item in the DRL 104 may also be referred to herein as a "request" or an "item."

The method 200 begins when the requestor 102 creates the DRL 104 (FIG. 2, operation 202). The DRL 104 may include various types of requests, such as documents, answers to specific questions, and/or data files. Each item in the DRL 104 may be clearly defined to ensure that respondents 106 understand what is required and can provide the appropriate data accurately and efficiently.

The requestor 102 may take any of a variety of forms. For example, the requestor 102 may be or include one or more humans, such as a legal team, financial auditors, or corporate executives, who need to gather information for due diligence, compliance, or other purposes. The requestor 102 may be or include one or more computers and/or computer programs, such as one or more software applications that are programmed to initiate data requests based on predefined criteria or triggers. This may, for example, include AI-driven systems that dynamically generate DRLs in response to evolving data needs. The requestor 102 may, for example, be a hybrid entity, combining human oversight with automated processes. For example, a legal team might use a software system to automatically generate initial DRLs, which are then reviewed and refined by human experts.

For each item in the DRL 104, the DRL 104 may specify whether an artifact is required for that item. An artifact, in this context, refers to any tangible or digital item that serves as evidence or documentation necessary to satisfy the data request. This may, for example, include documents, files, images, and/or other forms of data that are pertinent to the transaction or process being managed. The inclusion of data specifying a required artifact in connection with an item may be useful for ensuring that respondents 106 understand the exact requirements of each request. This feature may help to prevent misunderstandings and incomplete submissions, streamlining the process of data exchange and reducing the need for subsequent follow-up requests.

Items in the DRL 104 may take any of a variety of forms. For example, items in the DRL 104 may include any one or more of the following, in any combination:
  Form elements, i.e., interactive components that allow respondents 106 to input data in a structured manner. These elements may include, for example:
    Single Selection: Enables the respondents 106 to select one option from a list, ensuring that the response is clear and unambiguous.
    Multiple Selection: Allows respondents 106 to select multiple options, useful for gathering comprehensive data where more than one answer may be applicable.
    Text Field: Provides a space for free-form text, enabling respondents 106 to enter detailed responses or explanations.
  File upload requests. This allows respondents 106 to directly upload digital artifacts that are relevant to the transaction or process.
  Date Picker: Facilitates the collection of date information, ensuring accuracy and uniformity in date formats.
  Slider: Useful for gathering quantitative data or preferences within a range, allowing respondents to visually select a value along a continuum.
  Checkbox: Enables a simple yes/no or true/false selection, ideal for straightforward queries that require binary responses.
  Dropdown Menu: Provides a compact way to offer multiple choices without cluttering the interface, useful for lists where only one selection is needed.

In instances where an artifact is required for a specific item in the DRL 104, the requestor 102 may have the capability to further refine the data request by specifying, within the DRL 104, one or more questions that the artifact should address. This feature is designed to guide the respondents 106 in providing the most relevant and targeted information necessary for the request. The question(s) associated with an artifact may, for example, be formulated to elicit precise information that the requestor 102 deems crucial for the transaction. For example, if the required artifact is a financial report, the requestor 102 might include questions such as "What were the total sales in the last quarter?" or "Please provide a breakdown of operating expenses for the previous fiscal year."

The system 100 may provide the requestor 102 with the ability to determine the visibility of these questions to the respondents 106. This means that, for each item in the DRL 104, the requestor 102 can choose whether to make the associated questions visible to the respondents 106 or not. This decision may, for example, be made strategically based on the nature of the information being requested and the desired level of guidance provided to the respondents 106. The DRL 104 may include data indicating, for each item in the DRL 104, whether that item is to be made visible to the respondents 106.

Once the DRL 104 has been created, the system 100 may provide a notification 108 of the DRL 104 to the respondents 106 (FIG. 2, operation 204). The system 100 may provide the DRL notification 108 in any of a variety of ways, such as by sending an email message to the respondents 106, sending a text message to the respondents 106, or providing an in-application notification to the respondents 106. Any such mechanisms may include transmitting the DRL notification 108 over a network.

Once the respondents 106 have received the DRL notification 108, the system 100 may enable the respondents 106 to provide the items listed in the DRL 104 to the system 100 in any of a variety of ways (FIG. 2, operation 206). The items provided by the respondents 106 in response to the DRL 104 are shown in FIG. 2 as provided items 110. Individual items within the provided items 110 may also be referred to herein as "responses." The system 100 may, for example, facilitate providing the items requested by the DRL 104 through a user-friendly interface (e.g., a GUI). Such an interface may, for example, include any one or more of the following, in any combination:
  Direct Text Input: For items requesting textual information, respondents 106 may enter text directly into provided text fields. This method is suitable for answering specific questions or providing explanations.
  File Uploads: For requests requiring documents or other files, the system 100 may include an upload interface where respondents 106 may securely upload files directly from their computers or mobile devices.
  Link Submission: In cases where the requested information is available online, respondents 106 may submit links to the relevant web pages or documents.
  Data Entry Forms: For structured data collection, the system 100 may provide forms with fields such as dropdowns, checkboxes, and date pickers, which the respondents 106 may use to provide suitable inputs (e.g., dropdown list selections, checkbox selections, dates) within the provided items 110.
  Voice or Video Responses: For more complex responses, the system 100 may allow the submission of voice or video recordings by the respondents 106 within the provided items 110, particularly useful in cases where verbal explanations or demonstrations are necessary.
  API Integration: For automated data collection, the system 100 may integrate with external databases or systems via APIs, allowing respondents 106 to authorize data retrieval directly from their systems. In this case, any data received via an API may be included by the system 100 within the provided items 110. As this example illustrates, at least some of the provided items 110 may be obtained from a source other than the respondents 106.

As described herein, the provided items 110 may include both responses to DRL items and artifacts associated with those responses. For example, a single provided item within the provided items 110 may be associated with a corresponding particular one of the requests in the DRL 104, and may include: (1) a response to that request (such as a textual response or a selection from a dropdown menu); and (2) (optionally) one or more artifacts.

To further assist respondents 106 in providing relevant, adequate, and accurate responses to the DRL 104, the system 100 may automatically suggest, in connection with any particular item in the DRL 104, one or more recommended items (e.g., files) for submission as artifacts in connection with that DRL item. To provide this feature, the system 100 may, for example, analyze the content of the DRL item and data associated with the respondents 106 (such as data within the respondents' 106 linked data sources and/or data previously provided by the respondents 106 in response to the DRL 104) to identify data that is predicted to be relevant to the DRL item.

For example, in connection with a particular DRL item, the system 100 may use natural language processing (NLP) and/or models trained using machine learning (ML) to identify data (e.g., one or more documents) that are likely to satisfy the requirements of the DRL item. Based on this analysis, the system 100 may generate a list of recommended data (e.g., documents) for the respondents 106 to consider submitting as part of their response to the DRL item (whether as a response or an artifact). The respondents 106 may provide input selecting any such recommended data (e.g., one or more documents), in response to which the system 100 may include the respondents' 106 selection(s) within the provided items 110 in connection with the DRL item.

The system 100 may use any of a variety of NLP/ML techniques to perform such automated identification of recommended data (e.g., responses and/or artifacts) based on a particular DRL item and available data. For example, the system 100 may break down text from the DRL item and potential response data into tokens, and normalize those tokens (lemmatization) to reduce them to their base or root forms. Using statistical or ML-based methods, the system 100 may identify key terms and phrases from the DRL item that are indicative of the response requirements. The system 100 may convert text from the DRL item and potential response data into numerical vectors using techniques such as TF-IDF (Term Frequency-Inverse Document Frequency) or word embeddings (e.g., Word2Vec, BERT). This process facilitates the quantitative comparison of textual data.

The system 100 may compute a similarity measurement, such as by calculating the cosine similarity or other distance metrics between the vectorized form of the DRL item and potential response data, in order to assess which potential response data are semantically closest to the requirements of the DRL item.

This proactive approach helps ensure that the provided items 110 are pertinent and comprehensive, reducing the need for follow-up requests and streamlining the review process. Generating and provided automated recommendations to the respondents 106 also reduces the time and effort required by respondents 106 to identify and submit the appropriate documents, making the data collection process more efficient. By automating the suggestion of relevant responses, the system 100 helps minimize the risk of human error and ensures that the responses are as accurate and relevant as possible. The use of secure authentication methods like OAuth ensures that data security is maintained while providing the necessary access to external data sources.

Respondents 106 may interact with the system 100 to provide the items requested by the DRL 104 through a web browser or other application that implements a portal for viewing and responding to the DRL 104. Such a portal may ensure the confidentiality and integrity of the data exchanged. The portal may guide respondents through the process of viewing the DRL 104, understanding what is required, and submitting the items requested by the DRL 104. The system 100 may also provide tools for tracking the status of responses to the DRL 104, enabling respondents 106 to manage their responses effectively and ensure compliance with the requestor 102's deadlines. Such a tool may, for example, display, for each item in the DRL 104, output indicating whether the respondents 106 have provided a response to that item, and whether the submitted response has been deemed by the system 100 to be responsive (e.g., relevant and/or adequate) to the DRL item.

Upon receipt of any of the provided items 110 (e.g., response and/or artifact) from the respondents 106 in response to an item in the DRL 104, the system 100 may analyze the provided response/artifact to evaluate its relevance and/or adequacy (FIG. 2, operation 208). This analysis may be used to ensure that the artifact meets the specific requirements outlined in the DRL 104.

The system 100 may, for example, apply Optical Character Recognition (OCR) to convert the content of the artifact into machine-readable text. Following this conversion, the system 100 may generate a metadata element associated with the artifact. This metadata element encapsulates critical information about the artifact, such as any one or more of the following, in any combination:

Filename: The name of the file as uploaded by the respondent 106.
Date: The date on which the artifact was uploaded to the system 100.
Question Addressed: Identification of the specific question or item in the DRL 104 that the artifact was intended to respond to.
SHA Hash: A unique cryptographic hash generated for the artifact to ensure its integrity and to prevent tampering.
Extracted Text Content: The text that was extracted from the artifact, which is used for further analysis.

Following the creation of the metadata element, the system 100 may analyze the extracted text content to assess how well it addresses the request specified in the DRL 104. This analysis may, for example, be conducted using a Large Language Model (LLM) or embedding comparison. Such methods evaluate the semantic relevance of the text content to the questions or requirements posed in the DRL 104, such as by measuring a semantic distance between the text content and the questions/requirements posed in the DRL 104.

If the system 100 determines, based on the analysis, that the artifact's content scores below a predefined threshold of relevance or completeness (FIG. 2, operation 210), the system 100 may issue a notification to the respondent 106 (FIG. 2, operation 212). This notification may request that the respondent 106 review the artifact and confirm its responsiveness to the DRL request.

Any request in the DRL 104 may be associated with one or more hidden sub-questions (sub-requests) that are not directly visible to the respondents 106. These sub-questions may be used by the system 100 for any of a variety of purposes, such as to assist the system 100 in extracting and analyzing specific, detailed information from the artifacts provided by the respondents 106 in response to the main request, or to assist the system 100 in evaluating the relevance and/or adequacy of the respondents' 106 responses to the main request. The requestor 102 may provide input specifying such sub-questions in any of the ways disclosed herein in connection with the requests in the DRL 104.

As an example, consider a request in the DRL which asks, "Do you have any cyber-security insurance?" Associated with this request, a hidden sub-question may be, "How much coverage does the respondent have for PR in the event of a cyber-security breach?" The system 100 may not display or otherwise output to the respondents 106 representing such a sub-question.

When the respondent 106 submits an artifact, such as an insurance policy document, in response to the main request, the system 100 may use any hidden sub-question(s) associated with the main request to assist in analyzes that artifact to extract answers to the hidden sub-question(s). The system 100 may, for example, use any of a variety of NLP techniques to extract relevant information from the artifact based on the hidden sub-question(s). A variety of such techniques are disclosed elsewhere herein.

The system 100 may use such extracted information to assess whether the provided artifact and/or the response itself are relevant and/or adequate in relation to the main request, such as by using any of the techniques disclosed herein for evaluating relevancy and/or adequacy. This assessment makes use of the hidden sub-question(s) to aid in determining whether the respondents' 106 response (including any associated artifact(s) and/or metadata) fully address the main request.

Additionally or alternatively, the system 100 may provide output based on the extracted information to the requestor 102, in order to aid the requestor 102 in evaluating the respondents' 106 response (including any submitted artifact (s) and/or metadata). For example, the system 100 may provide output, to the requestor 102, representing a request and each hidden sub-question associated with that request, along with any information that the system 100 extracted from the respondents' 106 response (including associated artifact(s) and/or metadata) using that hidden sub-question. Providing such information to the requestor 102 may help the requestor 102 to understand, for example, not just that a cyber-security insurance policy exists, but also to understand the specifics of the coverage that might impact decision-making or risk assessment processes.

As a particular example of a request (also referred to herein as a "question") and a corresponding set of hidden, sub-questions, consider the following.

Main Question: "Do you have an external penetration test? If so, please upload the report."

Hidden Sub-Question 1: "Does the penetration test have any findings?"

Hidden Sub-Question 2: "Do any findings have a 'high' or 'critical' severity?"

Hidden Sub-Question 3: "Is the penetration test dated within the most recent year period?"

As described above, when processing the main question above, the system 100 may output the text of the main question to the respondent 106, but not output any of the hidden sub-questions to the respondent 106. Now assume that the respondent 106 answers "Yes" to the main question above and uploads a penetration test report as an artifact in response to the main question. The system 100 may employ text analysis (e.g., NLP) techniques to scrutinize the uploaded penetration test report using some or all of the hidden sub-questions above. For example, the system 100 may use those hidden sub-questions to search the uploaded penetration test report for the presence of findings, the severity of these findings, and the date of the test.

More specifically, for hidden sub-question 1, the system 100 may use that sub-question to determine whether the penetration test report indicates any findings of the penetration test. The system 100 may use hidden sub-question 2 to determine, based on the penetration test report, whether any findings indicated by the report having a severity of "high" or "critical." The system 100 may use hidden sub-question 3 to check the date of the report to confirm that the penetration test is recent, ideally within the last year, to ensure the relevance and timeliness of the findings.

The system 100 may also split the extracted text content into individual sentences. For each sentence, the system 100 may generate an embedding (a numerical representation that captures the semantic essence of the sentence). The system 100 may store such embeddings in an indexed vector database, such as pg_vector, which facilitates efficient and precise future searches and retrieval of data. This indexed storage of sentence embeddings allows for quick and accurate comparisons and searches within the text content, enhancing the system 100's ability to retrieve specific information and analyze the relevance of artifacts in future queries.

By performing the steps described above, the system 100 may ensure that each artifact not only meets the initial submission criteria but also contributes effectively to the comprehensive data collection goals of the DRL 104. This approach to artifact analysis and metadata management may enhance the overall quality and reliability of the data collected through the smart data room, supporting informed decision-making and efficient process management.

The description above describes a variety of techniques that may be used to assess the relevance and adequacy of any of the provided items 110 in relation to its corresponding request in the DRL 104. Such techniques may, for example, assess both relevance and adequacy in combination. Additionally or alternatively, embodiments of the present invention may assess relevance, adequacy, and/or accuracy of the provided items 110 separately.

For example, it may be helpful for the system 100 to evaluate the relevance of any particular response/artifact in the provided items 110 in relation to its corresponding request in the DRL 104. The system 100 may, for example, use any of a variety of NLP and/or ML techniques to analyze and score the relevance of each response. One example is semantic analysis. For example, the system 100 may convert text from both a DRL item and its corresponding provided item(s) into vector representations, using models such as TF-IDF or word embeddings. The system 100 may then calculates one or more similarity scores (e.g., cosine similarity) to determine how closely the content of the provided item matches the query terms and context of the DRL item. Additionally or alternatively, the system 100 may utilize a model such as BERT or GPT to assess semantic relevance by understanding the context in which words appear in the provided items, comparing it to the context of the DRL item's requirements.

As another example, the system 100 may use keyword matching to assess the relevance of a DRL item and its corresponding provided item(s). For example, the system 100 may identify key terms and phrases within the DRL item and search for these within the corresponding provided item(s) to produce a relevance score. Additionally or alternatively, the system 100 may look for synonyms and related concepts to those in the DRL item and/or its corresponding provided item(s), using ontologies and/or thesauri, to capture the semantic breadth of the DRL item and to identify relevant responses that might not use the exact phrasing of the DRL item.

As another example, if historical data is available, the system 100 may use machine learning to train one or more models to predict relevance based on features extracted from text comparisons between a DRL item and its corresponding provided item(s). Over time, the system 100 may employ reinforcement learning techniques to continuously refine its relevance assessments based on the success rates of previous recommendations and user interactions.

It may be helpful for the system 100 to evaluate the adequacy of any particular response/artifact in the provided items 110 in relation to its corresponding request in the DRL 104. Such adequacy evaluation involves assessing whether the provided item(s) fully meet the requirements specified by the corresponding DRL item. The system 100 may use any of a variety of techniques to perform such adequacy evaluation, such as any one or more of the following.

The system 100 may use content completeness analysis in its adequacy evaluation. For example, the system 100 may generate a checklist based on the DRL item requirements, which may include specific data points, document types, and/or information scope. The system 100 may then verify whether the corresponding provided item(s) cover all these checklist points. By comparing the content of the provided item(s) against the requirements of the DRL item, the system 100 may identify any missing elements or data gaps. This analysis helps in determining if additional information is needed to fulfill the request adequately.

The system 100 may perform a comparative analysis against model responses in its adequacy evaluation. For example, the system 100 may compare the provided item(s) to model responses and/or exemplary submissions from similar past DRL items. This comparison helps in benchmarking the adequacy of current responses against proven standards. As another example, if multiple respondents provide items for the same DRL item, the system 100 may perform a comparative analysis to gauge the relative adequacy of each response, highlighting best practices and identifying underperforming submissions.

It may be helpful for the system 100 to evaluate the accuracy of any particular response/artifact in the provided items 110, such as in any of the following ways. The system 100 may cross-reference a provided item with one or more external data sources to verify factual accuracy. This may, for example, include checking data against public records, databases, and/or third-party services that can confirm the veracity of specific information. The system 100 may, for example, analyze the provided item for internal consistency, ensuring that all data within the provided item is coherent and does not contain contradictory information. This check helps in identifying any discrepancies that might indicate errors or inaccuracies.

The system 100 may apply any of a variety of statistical methods to analyze the provided item. Such methods include, for example, regression analysis, anomaly detection, and other statistical tests that can identify outliers or improbable data points, which might suggest inaccuracies. For data that can be modeled predictively, the system 100 may use historical data to create one or more models and compare the provided item against the model(s) to assess its plausibility and accuracy.

The system 100 may use any of a variety of NLP/ML-based techniques to perform automated fact-checking on textual content with the provided item. This may include, for example, extracting claims from the text and verifying them against known facts or data repositories. For provided items that include references or citations, the system 100 may check the credibility and relevance of these sources, ensuring that they support the claims made in the response accurately.

The system 100 may scan the text for syntactic and/or semantic errors that could indicate inaccuracies in data reporting or interpretation. This may include, for example, checking for common data entry errors, misused terms, and/or incorrectly applied concepts. The system 100 may identify patterns that deviate from expected norms and/or historical trends, which might suggest inaccuracies or anomalies in the data provided.

By implementing some or all of these techniques for accuracy assessment, the system 100 may ensure that the data collected through the smart data room is not only comprehensive and relevant but also precise and reliable. This rigorous approach to verifying accuracy helps to maintain the integrity of the data management process, particularly in environments where decisions are critically dependent on the quality of data, such as financial auditing, legal proceedings, and regulatory compliance.

The system 100 may, in connection with any particular provided item (response or artifact), evaluate any one or more of the relevance of that provided item to its corresponding DRL request, the adequacy of that provided item in relation to its corresponding DRL request, and the accuracy of that provided item. As particular examples, in connection with any particular provided item, the system 100 may evaluate only the relevance of that provided item to its corresponding DRL request, only the adequacy of that provided item to its corresponding DRL request, both the relevance and the adequacy of that provided item in relation to its corresponding DRL request, and all three of the relevance, adequacy, and accuracy of the provided item.

The system 100 may enable the respondents 106 to provide any of the provided items 110 via one or more linked data sources, such as SharePoint, Dropbox, or OneDrive. This flexibility enables the system 100 to handle a wide range of data types and sources, enhancing the depth and utility of the information collected. The linkage to a linked data source may, for example, be established through a secure authentication method, such as OAuth, which ensures that the system 100 can access the required data without compromising the security of the respondent's data credentials. For example, the system 100 may use OAuth, a widely accepted open standard for access delegation, to securely connect to an external data repository. This method allows respondents 106 to grant the smart data room system 100 permission to access specific data within their external storage solutions without exposing their login credentials. Once a data source is linked, the system 100 may ingest data directly from the linked data source(s) using any of a variety of methods, including but not limited to an Extract, Transform, Load (ETL) pipeline. Any such data may be provided as responses within the provided items 110.

Every response provided by the respondents 106 in the provided items 110, whether directly entered or ingested from a linked data source, may be accompanied by metadata. Such metadata may, for example, include any one or more of the following, in any combination:

Responder Identification: Information about who provided the response (e.g., username, email address, and/or real name), which may be an individual or an entity.

Time of Response: The date and/or time when the response was submitted or updated.

Method of Response: Details about how the response was provided, such as the IP address, browser type, and/or any other relevant technical information that might help in auditing and security processes.

Source Identification: Metadata that verifies the origin of the response, such as the original source URL or the database name from which the data was extracted. This can be useful for validating the authenticity of the data and for tracing back to the original source if needed.

Data Integrity Hash: A cryptographic hash of the response at the time of submission. This hash can be used to verify that the data has not been altered since its submission, enhancing the security and integrity of the stored data.

Access Control Details: Information about who has accessed the response and what operations they have performed on the response. This may include, for example, one or more user IDs, access times, and the types of access granted (e.g., read, write, delete). This metadata is useful for security audits and for ensuring that data access complies with policy regulations.

Version History: For responses that undergo revisions, metadata about each version of a document, file, or data set, including version number, timestamp of revisions, and identifiers of users who made the revisions. This helps in maintaining a clear audit trail of how data has evolved over time.

Geolocation Data: The geographical location where the response was submitted or accessed from, which can be derived from IP addresses or other location-aware services. This information can help in enforcing data sovereignty laws and in analyzing access patterns for security purposes.

Device and Application Information: Details about the devices and applications used to submit or access the response, such as device type, operating system, application versions, and configuration settings. This can help in troubleshooting issues and in ensuring that the system is accessed only through secure and compliant methods.

Compliance Tags: Metadata tags that indicate whether the response meets certain compliance criteria, such as GDPR, HIPAA, or other regulatory standards. This can facilitate quick identification of data that complies with specific legal frameworks, aiding in compliance audits and reporting.

Language of Submission: The language in which the response was submitted. This is particularly useful in global transactions involving multiple languages, ensuring that responses can be accurately translated and used across different regions.

Biometric Verification Data: Metadata that includes one or more biometric identifiers used for verifying the identity of the individual who provided the response. This may include, for example, fingerprints, facial recognition data, and/or voiceprints, which enhance security by ensuring that responses are submitted by authorized personnel only.

Any such metadata may be received manually from the respondents 106, obtained from an external data source (such as any of the linked data sources disclosed herein), generated automatically by the system 100 or another system, or any combination thereof. Although the metadata above is described as being associated with a "response," it should be understood that any such metadata may be associated with any aspect of a provided item, such as its response and/or artifact(s). Any operations that are disclosed herein as being performed on a provided item (such as evaluating its relevance, adequacy, and/or accuracy) may include performing such operations on the metadata associated with that provided item.

The system 100 may be designed to support a variety of response formats to accommodate the preferences and capabilities of different respondents 106. For items in the DRL 104 that require a text response, respondents 106 may choose from any of a variety of input methods, such as any one or more of the following:

Typed Text: Respondents 106 may enter text manually through a keyboard interface.

Speech-to-Text: This option allows respondents 106 to speak their response, which the system 100 may then convert into text using speech recognition technologies.

Audio or Video Recording: Respondents 106 may also provide responses in the form of audio and/or video recordings. The system 100 may be equipped to handle and store these media formats, and if necessary, extract text from them using speech-to-text technologies.

The system 100 may be designed with global accessibility in mind, incorporating language translation capabilities to ensure that the data room is usable and effective for participants across different linguistic backgrounds. This feature enhances the system 100's usability and ensures that data can be collected and analyzed efficiently, regardless of the original language of the input. For example, all prompts, item requests, and user interface (UI) elements displayed by the system 100 may be translated automatically by the system 100 into any language.

Responses provided by the respondents 106 can be handled in multiple ways concerning language translation and storage. For example, responses may be stored in the system 100 in their original language as provided by the respondents 106. This method preserves the original phrasing and nuances of the response. As another example, the system 100 may translate responses into the requestor 102's language of choice before being stored. This option is particularly useful when the requestor 102 is not proficient in the language of the response. The system 100 may also store both the original and the translated version of the responses. This dual storage ensures that the original data is preserved for authenticity while also providing a translated version for ease of understanding by the requestor 102. Any of these translation features may be performed in connection with any aspect of the provided items, such as their responses, artifacts, and associated metadata.

To facilitate the creation of embeddings and ensure consistency in data analysis, any text from item requests and responses that is used to create embeddings may automatically be translated by the system 100 into a common language, typically English. This standardization may be useful for the analytical processes within the system 100, such as embedding comparison or application of machine learning models, which may require a consistent language base to function accurately. Such pre-embedding translation, however, is not required. More generally, embodiments of the present invention may create embeddings based on text written in any language. For example, embodiments of the present invention may create embeddings of any text in its original language, without first translating it into another language. If embeddings are created based on text written in different languages (e.g., to create one embedding based on text written in one language and to create another embedding based on text written in another language), embodiments of the present invention may compare such embeddings across languages without loss of generality, provided that the embedding-creation LLM is proficient in both languages.

By integrating these comprehensive translation and storage options, the system 100 ensures that language barriers do not impede the effective management and analysis of data within the smart data room. This capability not only enhances the accessibility of the system 100 for a global user base but also improves the quality and usability of the data collected, supporting more informed decision-making and efficient process management.

Although the provided items 110 are shown in FIG. 1 as being provided once by the respondents 106, in practice the respondents 106 may update any of the provided items 110 one or more times. In response to such updates, the system 100 may either replace the original version with the updated version, or store both the original version and the updated version. Regardless of how the provided items 110 are received from the respondents 106, the system 100 may store the provided items 110 and any other data disclosed herein in a set of data that is referred to herein as the "data room" (FIG. 2, operation 214).

The system 100 may be equipped with sophisticated mechanisms to manage and monitor the flow of responses to the DRL 104 items from the respondents 106. This dynamic interaction ensures that the requestor 102 is kept informed of the latest developments and can manage the data collection process efficiently.

For example, as respondents 106 submit their responses to items in the DRL 104, the system 100 may aggregate these responses into a running feed within the provided items 110. This continuous feed acts as a real-time ledger of all responses, providing a comprehensive overview of the data collection progress. Based on the data accumulated in the running feed within the provided items 110, the system 100 may generate response output 112. The response output 112 may be presented in various formats depending on the needs of the requestor 102 and the configuration of the system 100, such as any one or more of the following:

In-Application Notification: For users actively using the system interface, notifications may pop up within the application, alerting them to new responses or updates.

Email: The system 100 may automatically send email to the requestor 102 summarizing recent updates, ensuring that users not currently logged into the system 100 are also informed.

SMS: For immediate alerts, SMS messages may be sent directly to the requestor 102's mobile device, providing instant updates.

Batched Periodic Alerts: The system 100 may also compile updates into periodic summaries, which are sent out at regular intervals. This method is useful for managing data flow in a less disruptive manner. Such summaries may, for example, be generated using an AI model, such as one or more Large Language Models (LLM).

Upon receiving a response to a particular item in the DRL 104, the system 100 may provide the requestor 102 with means to review the response. If the information provided is insufficient or if further clarification is needed, the requestor 102 may provide input requesting additional information to the system 100. In response to receiving such a request, the system 100 may mark the corresponding item in the DRL 104 as "open" again, signaling that a further response are needed to that item from the respondents 106. This re-opening of the item initiates a repeat of the response request process, ensuring that all data collected meets the required standards and completeness.

The system 100 may include deadline management and notification features to encourage and facilitate timely responses from the respondents 106 to the items listed in the DRL 104. This functionality may be useful for maintaining the efficiency and effectiveness of the data collection process.

The system 100 may provide the requestor 102 with the ability to set a deadline for the completion of some or all items in the DRL 104. This deadline may, for example, be included directly within the DRL 104 or stored in other data in the system 100. The system 100 may, at any time(s), provide output representing this deadline to the respondents 106, such as at the time(s) of presenting the items in the DRL 104 to the respondents 106.

To manage and encourage adherence to this deadline, the system 100 may be designed to send follow-up notifications 114 to the respondents 106. These notifications serve as reminders of the pending items and the approaching or elapsed deadline. The frequency and timing of these notifications may be adjusted based on any of a variety of factors, such as the proximity to the deadline. For example, notifications may be sent less frequently (e.g., once per week) as the deadline approaches. This periodic reminder helps keep the deadline top of mind for respondents without being overly intrusive. If the deadline has passed and responses are still outstanding, the frequency of notifications may increase (e.g., once per day) to urge prompt completion of the pending items.

The follow-up notifications 114 may include any of a variety of information to assist respondents 106 in managing their response tasks. For example, each notification may identify one or more specific items in the DRL 104 that have not yet been responded to, allowing respondents 106 to easily see what remains to be completed. The follow-up notifications 114 may provide a summary of the completion status, such as the percentage of items that have been completed versus those that are still pending. This overview helps respondents gauge their progress and prioritize their efforts. To enhance clarity and ease of review, the item list from the DRL 104 may be presented, e.g., in an outline form, within the follow-up notifications 114. This structured format makes it easier for respondents to navigate the list and understand the requirements of each item.

By integrating these deadline management and notification features, the system 100 may ensure that both the requestor 102 and the respondents 106 are well-informed about the status of the data collection process. The ability to set, communicate, and remind about deadlines, coupled with detailed and structured notifications, supports an efficient workflow and helps prevent delays in the completion of the DRL 104. This functionality may be useful for maintaining the momentum of the data collection process and ensuring that all necessary information is gathered within the required timeframes.

The requestor 102 may provide a request to the system 100 for some or all of the data in the data room to be securely deleted. In response to such a request, the system 100 may securely delete the requested data, which may, for example, include any of the data disclosed herein (e.g., the DRL 104, provided items 110, and response output 112). Any of the respondents 106 may provide a request to the system 100 for some or all of the data in the data room to be securely deleted. In response to such a request, the system 100 may notify the requestor 102, who may approve of or reject the request from the respondent. The system 100 may then delete the data in the data room only if, and in response to, approval from the requestor 102.

The system 100 may use any of a variety of techniques to perform such secure data deletion, such as single-pass or multiple-pass overwriting, cryptographic erasure (e.g., destroying one or more encryption keys associated with the secure data room), magnetic degaussing of storage media on which the data room is stored, physical destruction (e.g., shredding and/or pulverizing) of storage media in which the data room is stored, secure wiping of data in the data room (e.g., using the U.S. Department of Defense 5220.22-M standard or the National Institute of Standards and Technology (NIST) guidelines for secure data wiping), zeroization of volatile memory components such as RAM, and using secure file deletion algorithms.

The system 100 may facilitate interactive and dynamic communication between the requestor 102 and the data stored within the data room. This may, for example, be achieved through a chat interface that allows the requestor 102 to pose questions directly to the system 100, such as in the form of natural language queries. This flexibility allows the requestor 102 to phrase questions in a manner that is intuitive and straightforward, without the need for specialized query languages or technical syntax.

Upon receiving a query 116 from the requestor 102, the system 100 may use a query processor 118 to apply any of a variety of processing techniques to interpret and respond to the question, thereby generating a query response 120 and providing the query response 120 to the requestor 102. These techniques may include, but are not limited to:
   Natural Language Processing (NLP): This technology enables the system to understand and process human language, making sense of the query in the context of the data available.
   Machine Learning Models: Advanced models can be used to analyze the query and retrieve relevant information from the data room. These models are trained to understand the nuances of the data and the intent behind the questions.
   Data Retrieval Algorithms: Specific algorithms are employed to efficiently search and retrieve data from the data room that is relevant to the query.

For example, the system 100 may use tokenization to break down the text of the query into smaller units called tokens, which may, for example, be words or phrases. The system 100 may analyze the grammatical structure of the query to understand the relationships between tokens, which helps in comprehending the overall intent of the query.

The system 100 may use Named Entity Recognition (NER) to identify and classify key information in the query, such as names, dates, or specific terminologies related to the data room content. This helps in pinpointing the exact data that the query is referring to.

The system 100 may perform any of a variety of semantic analysis, such as using techniques such as Word2Vec or GloVe to convert words into vector representations that capture semantic meanings. These embeddings may help the system 100 to understand the context and nuances of the query. The system 100 may use any of a variety of models, such as BERT (Bidirectional Encoder Representations from Transformers) or GPT (Generative Pre-trained Transformer) to provide deeper semantic understanding by considering the context in which each word appears. This is particularly useful for complex queries where the meaning depends heavily on the surrounding words.

The system 100 may use any of a variety of machine learning models for query processing. For example, the system 100 may use any of a variety of information retrieval models, such as TF-IDF (Term Frequency-Inverse Document Frequency) to evaluate how relevant a word is to a document in a collection of documents, and/or BM25, which uses term frequency and inverse document frequency, along with document length normalization, to retrieve the most relevant documents related to the query.

The system 100 may use any of a variety of question-answering models to process queries. For example, the system 100 may use retrieval-based models, which first retrieve a subset of documents that are likely to contain the answer and then apply NLP techniques to extract the specific information needed. As another example, the system 100 may use any of a variety of end-to-end deep learning models. For example, models such as transformer-based networks may be trained on past data interactions to directly predict answers to queries by understanding complex patterns and relationships in the data.

By integrating these NLP and ML techniques, the smart data room system 100 may process queries with high accuracy and relevance, providing responses that are informed by the comprehensive data stored within the data room. This capability not only enhances the user experience by allowing intuitive language-based interactions but also ensures that the information retrieved and presented is precise and actionable, supporting effective decision-making processes within the data room environment.

Regardless of the techniques employed by the system 100 to process the requestor 102's query, the system 100 may reference the data in the data room when processing that query, so that the resulting output is based on, and may include, data from the data room. Examples of such data room data include the DRL 104 and the provided items 110.

The system 100 may provide any answers generated by the system 100 to the requestor 102 through the chat interface. This output is designed to be easily understandable and may include additional context or references to the data to support the answers provided.

As the requestor 102 provides each query 116 to the system 100 and the system 100 generates the corresponding query response 120, the system 100 may generate a running report that contains both the query 116 and the corresponding query response 120. This report may be structured in an outline format. More specifically, the queries, and their corresponding query responses, may be displayed in the relevant sections of the report or interface where they were entered.

The system 100 may allow the requestor 102 to upload additional documents, such as other reports or notes from interviews, to be uploaded and integrated into the system 100's knowledge base, which the system 100 may access when processing each query 116. This feature enhances the depth and breadth of the data available through the chat interface. By incorporating these documents into the knowledge base, the system 100 may draw upon a wider array of information when responding to queries, providing more comprehensive and informed answers.

The system 100 may include a document validation process that enhances the reliability and credibility of the information contained within documents uploaded by the requestor 102. This process may, for example, be initiated upon request of the requestor 102 and may involves any of a variety of steps to analyze and validate the content of the document.

For example, the system 100 may convert the document into plain text. This step may be useful for enabling further analysis and may be achieved using Optical Character Recognition (OCR) technology. The system 100 may process the plain text to identify and split it into individual sentences. This segmentation may be useful for the subsequent steps of analysis, allowing the system 100 to evaluate the document at the sentence level.

The system 100 may generate an embedding based on each sentence from the document. These embeddings are high-dimensional vectors that represent the semantic meaning of the sentences, facilitating the comparison of textual content based on its underlying meaning rather than just superficial characteristics. The system 100 may then select the top 'k' sentences from the existing corpus of data that are most similar to each sentence in the uploaded document. This selection may be based on the similarity of their embeddings, which helps in identifying relevant contexts and references within the larger data set.

The system 100 may use a binary classifier to assess whether each of the top 'k' similar sentences supports the corresponding sentence in the document. This classifier may be trained to understand and evaluate the relationship between sentences, determining the validity and relevance of the information presented.

For each sentence in the document, the system 100 may compute an aggregate score based on the results of the binary classifications. This score reflects the level of support that the sentence receives from the selected similar sentences in the corpus, providing a quantitative measure of its validity.

The system 100 may generate a summary of the document, highlighting each assertion made within the document and its level of support based on the aggregate scores. This summary is designed to provide a clear and concise overview of the document's content and the extent to which it is supported by existing data. The system 100 may present the summary in a visually intuitive format, such as a document where each sentence is color-coded—from red (indicating unsupported assertions) to green (indicating well-supported assertions). Additionally, comments may be included to provide insights or explanations regarding the findings. The system 100 may also generate a list of sentences that were found to be unsupported or weakly supported, allowing for easy review and further investigation.

This document validation process not only enhances the trustworthiness of the information but also supports detailed analysis and review. By automating the validation of document content through advanced techniques such as embedding comparison and binary classification, the system ensures that the data maintained and shared within the environment is both accurate and reliable. This capability may be useful for maintaining the integrity of the data room and supporting informed decision-making.

The system 100 may streamline the process of creating and responding to DRLs by incorporating functionalities that allow for the reuse of previously created content, thereby enhancing efficiency and consistency in data requests and responses.

For example, after the requestor 102 has created the DRL, the system 100 may enable the requestor 102 to save this DRL as a template. This feature allows the requestor 102 to preserve the structure and content of the DRL for future use, which is particularly useful for recurring data requests that follow a similar format or require similar information. The requestor 102 may save a plurality of DRLs in this way, thereby creating and storing a library of these saved templates. This library enables the requestor 102 to quickly access and reuse existing templates, reducing the need to recreate similar DRLs from scratch. The availability of templates speeds up the process of DRL creation and ensures consistency across similar data requests.

The system 100 may enable respondents 106 to save their provided items (e.g., responses, artifacts, and/or metadata) for future use. This capability is beneficial when respondents 106 are faced with similar DRLs, either from the same requestor 102 or different ones, allowing them to efficiently manage their responses without needing to start anew each time. When a respondent 106 is presented with a new DRL request that is similar to one they have previously responded to, the system 100 may automatically suggest their previous responses as potential answers. This suggestion may be based on the similarity between the new DRL request and previous ones. To identify whether a current DRL request is similar to a previous one, the system 100 may, for example, employ cosine similarity measures. This technique involves comparing the embedding of the current DRL request with embeddings of previously responded DRL requests. Cosine similarity provides a numerical value that indicates how closely the content of the current request matches with past requests, based on the angle between their embedding vectors in a multi-dimensional space.

The system 100 may use embeddings to represent the semantic content of DRL requests in a form that can be quantitatively analyzed. By converting text into embeddings, the system 100 may effectively compare the underlying meanings and relevance of different DRLs beyond mere textual similarity.

The system 100 may implement an interview process to facilitate collection of provided items (e.g., responses, artifacts, and/or metadata) from the respondents 106 to items in the DRL 104. During such an interview, the system 100 may actively assist the requestor 102 by identifying and prompting the requestor 102 with questions related to open DRL items-those items for which responses have not been received from the respondents 106, or for which the responses from the respondents 106 have been deemed not relevant, inadequate, and/or inaccurate.

The system 100 may provide a dynamic interface that updates in real-time, displaying questions for the requestor 102 to ask and capturing the responses from the respondents 106. This interface may also allow the requestor 102 to mark questions as resolved or flag them for follow-up, ensuring that all concerns are addressed systematically.

As the interview progresses, the requestor 102 may enter the provided items (e.g., responses, artifacts, and/or metadata) manually into the system 100 for storage as if those provided items had been provided directly by the respondents 106 to the system 100. This direct entry may be facilitated through any of a variety of user interface elements, such as a text input interface within the system 100, in which the requestor 102 may type contents of provided items (e.g., responses) as they are received. Alternatively, for example, the system 100 may automatically record the provided items (e.g., responses) from the respondents 106, without requiring that the requestor 102 enter them manually. As yet another example, the system 100 may allow for the provided items responses to be captured via voice and/or video recordings. This method is particularly useful in capturing the full nuance and context of the respondents' answers, which might be lost in text-only formats. For ease of analysis and documentation, the system 100 may convert any voice or video responses into text using speech-to-text technologies. The system 100 may store the original voice/video recordings and/or the resulting text.

The system 100 may store any of the information received/generated during the interview, such as responses from the respondents 106, answers/notes entered by the requestor 102, audio/video recordings, and transcripts of such recordings, in the system 100. The system 100 may, for example, integrate any such data from the interview with existing data related to the same DRL items. This integration allows for comparison and validation of new information against what is already known, enhancing the reliability of the data collected.

The system 100 may incorporate a "streaming mode" feature, designed to facilitate real-time interviews between a virtual avatar and the respondents 106. This mode leverages communication and data processing technologies to enhance the interaction and data collection processes. In the streaming mode, the system 100 may use a real-time avatar, which may include voice and video capabilities, to conduct interviews. This avatar acts as the interviewer, posing questions based on the DRL 104 to one or more people representing the respondents 106. The use of an avatar allows for a more interactive and engaging interview experience, simulating a face-to-face conversation.

Such interviews may be conducted over a popular communication platform, such as Zoom, enabling live and real-time responses from the respondents 106. This setup allows for a seamless interview process without the need for physical presence, reducing logistical barriers and enhancing accessibility. The avatar may join the interview call using a unique email address associated with the specific data room. This method ensures that each interview session is securely linked to the relevant data room, maintaining the organization and confidentiality of the data.

During the interview, the system 100 may capture the identity of the individual acting on behalf of the respondent 106, such as by utilizing user information provided by the communication platform (e.g., Zoom). This information may be used to attribute quotes and responses to the correct individual, ensuring the accuracy and reliability of the data collected.

Responses received during the interview may be converted by the system 100 into text using speech-to-text technology. These text responses may be attached to the corresponding DRL items, ensuring that all information is accurately categorized and stored.

If the avatar determines that a response is inadequate or unclear (such as by using the method described above), it can ask the representative of the respondents 106 for clarification. This feature ensures that the data collected is complete and meets the required standards of clarity and detail.

The system 100 may record the entire interview (e.g., audio and/or video). Such a recording serves as a comprehensive artifact of the interaction and may be entered into the data room as an artifact for record-keeping and further analysis.

The interview format may be designed to be interruptible, allowing respondents 106 to address any DRL item at any time during the session. This flexibility ensures that respondents can provide thorough and thoughtful responses, enhancing the quality of the information gathered.

Respondents 106 may have the option to invite additional people to join the interview. These participants may assist in providing comprehensive responses, especially for complex or detailed DRL items.

The streaming mode in system 100 offers a dynamic and efficient way to conduct interviews, collect data, and manage interactions with respondents 106. By integrating real-time communication technologies with advanced data processing capabilities, the system 100 ensures that data collection is not only efficient but also rich in quality and context. This mode is particularly valuable in scenarios where detailed and accurate data collection is critical to the decision-making process.

Embodiments of the present invention have a variety of advantages over prior systems, such as the following. The DRL 104 provides a structured framework for requestors to specify the data and artifacts needed. This structured approach ensures that all requests are clear, comprehensive, and organized, which helps in reducing ambiguities and improving the accuracy of the responses received.

The system 100 automates the process of collecting artifacts associated with each DRL item. Respondents can upload documents, images, or other types of files directly through the system interface. This automation not only speeds up the collection process but also reduces the likelihood of human error, such as missing or incorrect submissions.

As artifacts are uploaded, the system 100 employs real-time validation techniques, such as Optical Character Recognition (OCR) and machine learning models, to analyze and verify the content. This immediate validation ensures that the artifacts are relevant and responsive to the DRL items, enhancing the overall quality of the data collected.

The system 100 continuously evaluates the responses and artifacts against the DRL requirements. If a response is found to be inadequate or below a certain quality threshold, the system can prompt the respondent for additional information or clarification, ensuring that all collected data meets the necessary standards.

All data and artifacts collected are stored in a centralized data room within the system 100. This centralization facilitates easy access and management of the data, allowing requestors to quickly find and review the information they need.

The system 100 allows for the saving of DRLs as templates, which can be reused for similar future data requests. This feature saves time and effort for the requestors by eliminating the need to recreate DRLs from scratch for recurring data needs.

The system 100 keeps all parties informed through real-time notifications and alerts about the status of the data requests. These notifications ensure that respondents are aware of deadlines and any issues with their submissions, promoting timely and complete responses.

Respondents can invite additional contributors to assist in responding to the DRL items, fostering a collaborative environment. This collaboration can lead to more comprehensive and accurate data collection, especially for complex requests.

Overall, the system 100 significantly enhances the efficiency, accuracy, and ease of managing data requests and artifact collection. By automating and structuring the data collection process, providing tools for real-time validation and response evaluation, and facilitating better management and accessibility of data, embodiments of the present invention ensure that high-quality, relevant data is collected promptly and efficiently. These capabilities make embodiments of the present invention particularly valuable in environments where effective data management is critical to operational success.

In some embodiments, the techniques described herein relate to a method performed by at least one computer processor executing computer program instructions stored on at least one non-transitory computer-readable medium, the method including: (A) receiving, by a data management system, a Data Request List (DRL) from a requestor, the DRL including a plurality of requests; (B) storing the DRL in a data room accessible by a respondent; (C) prompting the respondent to provide a response to a first request in the DRL; (D) receiving an initial response from the respondent to the first request; (E) validating the initial response to assess relevance of the initial response to the first request; (F) determining, based on the relevance of the initial response to the first request, whether the initial response is sufficiently relevant to the first request; (G) in response to determining that the response is not sufficiently relevant to the first request, repeating (C)-(F) until the respondent provides a response that is determined to be sufficiently relevant to the first request.

The method may further include performing (A)-(G) for each of the plurality of requests in the DRL, thereby generating data, in the data room, representing a plurality of responses to the plurality of requests.

The first request may include a request for an answer to a question, and wherein the initial response includes an answer to the question. The first request may include a request for a file, and the initial response may include a file.

The first request may further specify a required artifact; wherein the initial response includes an initial response artifact; and wherein validating the initial response includes validating the initial response based on the initial response and the initial response artifact.

Operation (E) may further include assessing adequacy of the initial response based on the first request in the DRL.

Operation (E) may further include assessing accuracy of the initial response.

Operation (C) may include: (C) (1) automatically identifying a recommended initial response to the first request in the DRL; (C) (2) providing output representing the recommended initial response to the first request in the DRL; and (C) (3) receiving, from the respondent, input selecting the recommended initial response to the first request in the DRL.

The method may further include: (H) in response to a user request, securely deleting the DRL and the response that was determined to be sufficiently relevant to the first request.

Operation (C) and (D) may be implemented using a dynamic chat-based user interface.

In some embodiments, the techniques described herein relate to a system including at least one non-transitory computer-readable medium having computer program instructions stored thereon, the computer program instructions being executable by at least one computer processor to perform a method, the method including: (A) receiving, by a data management system, a Data Request List (DRL) from a requestor, the DRL including a plurality of requests; (B) storing the DRL in a data room accessible by a respondent; (C) prompting the respondent to provide a response to a first request in the DRL; (D) receiving an initial response from the respondent to the first request; (E) validating the initial response to assess relevance of the initial response to the first request; (F) determining, based on the relevance of the initial response to the first request, whether the initial response is sufficiently relevant to the first request; (G) in response to determining that the response is not sufficiently relevant to the first request, repeating (C)-(F) until the respondent provides a response that is determined to be sufficiently relevant to the first request.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the invention described herein incorporate several features that represent significant improvements to the functioning of a computer. These features are not only rooted in computer technology but also enhance the efficiency and effectiveness of data management systems.

For example, the system 100 utilizes OCR technology to convert uploaded documents into machine-readable text. This feature goes beyond simple text recognition; it includes advanced analysis capabilities such as text splitting and embedding generation. These processes improve the computer's ability to understand and manipulate large volumes of unstructured data, transforming it into structured, actionable information.

The system 100 employs sophisticated machine learning algorithms to validate and classify the relevance and accuracy of the data received. This is not a generic application of machine learning but a specific implementation designed to enhance the system 100's ability to automatically assess the quality of data based on predefined criteria. This feature represents an improvement in the computer's functionality, enabling it to perform complex decision-making tasks that are integral to the data validation process.

The system's capability to conduct interviews using a real-time avatar that interacts with users through voice and video is rooted in advanced computer technology. This feature involves real-time processing of audio and video streams, natural language processing for understanding and generating human-like responses, and dynamic data integration. These technologies collectively enhance the system 100's functionality by enabling sophisticated, real-time interactions that are responsive and adaptive to user inputs.

Integrating speech-to-text technology to convert spoken responses into written text during interviews represents an improvement in the computer's ability to process and archive human speech. This technology is useful for ensuring that data collected during interviews is accurately captured and made searchable, significantly enhancing data accessibility and usability.

The implementation of automated systems for generating and sending notifications based on the status of data requests involves sophisticated scheduling, monitoring, and communication technologies. This feature improves the system 100's operational efficiency and responsiveness, ensuring that all stakeholders are timely informed about important updates and actions required.

Each of these features demonstrates how the invention improves the functioning of a computer or another type of data processing system. They are not merely abstract ideas or routine processes; instead, they are deeply rooted in computer technology and are essential for achieving the stated objectives of enhanced data management, security, and user interaction.

Embodiments of the invention described herein address a significant technical problem within the realm of data management systems, specifically the challenges associated with data integrity, security, and efficient management of large volumes of data in a secure and accessible manner. Traditional data management systems often struggle with these issues due to limitations in manual processing and non-technical solutions, which are inadequate for handling the complexity and scale of modern data requirements.

More particularly, existing data management systems, including both physical data rooms and earlier virtual data room solutions, are often hampered by inefficiencies in document handling, security vulnerabilities, and difficulties in maintaining data integrity. These systems lack the capability to efficiently process and validate large volumes of data from diverse sources, leading to increased risks of errors and data breaches. Additionally, the manual processes involved are time-consuming and prone to human error, making them unsuitable for scenarios where timely and accurate data access is critical.

Embodiments of the present invention utilize advanced technical means to overcome these challenges, thereby enhancing the functionality and reliability of data management systems. Examples of technical components and processes utilized by embodiments of the present invention include:

Optical Character Recognition (OCR): OCR technology is used by embodiments of the present invention to convert uploaded documents into machine-readable text. This technology automates the data entry process and enables further data processing steps, such as text analysis and validation.

Machine Learning Algorithms: Machine learning algorithms may be integrated into embodiments of the present invention to validate and classify the relevance and adequate of the data received. These algorithms significantly reduce the likelihood of errors and provide enhanced abilities to make informed decisions based on relevant and complete data.

Real-Time Processing: Embodiments of the present invention incorporate real-time processing capabilities, particularly in the context of conducting live interviews using a real-time avatar. This feature allows for dynamic interaction with respondents, immediate processing of spoken responses via speech-to-text technology, and instant validation of information, thereby ensuring that data integrity is maintained throughout the data collection process.

These technical solutions are specifically designed to address the identified technical problems and are not achievable through non-technical or manual processes. By automating and enhancing various aspects of data management, embodiments of the present invention not only improve the efficiency and security of data handling but also ensure that data integrity is maintained at all times. This represents a significant advancement over existing technologies, providing a concrete and tangible solution to a well-defined technical problem in the field of data management systems.

Furthermore, embodiments of the present invention are necessarily rooted in computer technology. As a result, embodiments of the present invention are not merely abstract ideas, instead embodiment specific application that solve problems inherently linked to computer technology.

For example, embodiments of the smart data room system disclosed herein address issues that arise specifically in the realm of digital data management. Unlike traditional methods that could be performed manually or mentally, the functionalities and processes integrated into embodiments of the smart data room system disclosed herein are only feasible and practical through the use of advanced computer technologies.

More specifically, embodiments of the present invention address specific problems unique to digital data environments, such as secure data exchange, efficient handling of large volumes of data, and real-time processing and validation. These challenges do not exist outside of computer technology and are inherent to the digital data management field. Embodiments of the present invention use a variety of inherently computer-based features to address these problems, such as the OCT, machine learning, and real-time processing features described above.

Furthermore, embodiments of the present invention do not merely automate traditional processes, but instead redefine how data management is conducted in a digital setting using techniques that are necessarily and inherently rooted in computer technology. By integrating real-time interaction, automated validation, and compliance into a unified platform, embodiments of the present invention offer a novel solution that significantly improves over prior computer practices.

In addition, embodiments of the present invention transform digital data from one state to another, significantly enhancing the utility, security, and manageability of that data. For example, embodiments of the smart data room technology disclosed herein not only process data but actively transforms data in ways that substantially improve its functionality and applicability in business and legal environments. This transformation supports the operation of embodiments of the present invention and is achieved using inherently computer-implemented technologies.

For example, through the use of Optical Character Recognition (OCR) and parsing algorithms, embodiments of the present invention transform unstructured data (such as scanned documents and images) into structured, machine-readable formats. This conversion is a transformation that changes the nature of the data, making it searchable, sortable, and analyzable by computers, thereby enhancing its utility for decision-making processes.

Furthermore, embodiments of the present invention employ machine learning algorithms to validate and enhance the quality of data. This may involve, for example, transforming raw data inputs into verified and reliable information by filtering out inaccuracies and supplementing data points with additional validated information. This process changes the reliability and credibility of the data, transforming it into a more valuable asset for the purposes disclosed herein.

As another example, utilizing real-time processing capabilities, embodiments of the present invention enable dynamic interaction with data. This includes real-time updates, modifications, and enhancements based on user interactions and automated system processes. The ability to interact with and modify data in real-time transforms the data's state, adapting it to current needs and contexts, which is a significant alteration from static data management practices.

As yet another example, the smart data room's ability to securely delete data upon request further exemplifies its transformative nature. This feature changes the state of the data from being accessible and stored to being irretrievably erased, ensuring compliance with privacy standards and regulations.

The transformative nature of the smart data room system's operations-such as converting, validating, interacting with, and securely deleting data-demonstrates that it does more than simply use technology to automate tasks. It changes the form and function of data, making it more secure, useful, and compliant with regulatory requirements. This transformation represents a practical application of technology that significantly alters the nature of the subject matter it processes.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

Although terms such as "optimize" and "optimal" are used herein, in practice, embodiments of the present invention may include methods which produce outputs that are not optimal, or which are not known to be optimal, but which nevertheless are useful. For example, embodiments of the present invention may produce an output which approximates an optimal solution, within some degree of error. As a result, terms herein such as "optimize" and "optimal" should be understood to refer not only to processes which produce optimal outputs, but also processes which produce outputs that approximate an optimal solution, within some degree of error.

What is claimed is:

1. A method performed by at least one computer processor executing computer program instructions stored on at least one non-transitory computer-readable medium, the method comprising:
   (A) receiving, by a data management system, a Data Request List (DRL) from a requestor, the DRL including a plurality of requests;
   (B) storing the DRL in a data room accessible by a respondent;
   (C) prompting the respondent to provide a response to a first request in the DRL;

(D) receiving an initial response from the respondent to the first request;

(E) validating the initial response to assess relevance of the initial response to the first request, comprising: (i) performing semantic analysis by converting the initial response and the first request into numerical vector representations using machine learning embedding techniques and calculating semantic similarity between the vector representations, and (ii) performing textual analysis using natural language distance calculations including at least one of string distance metrics or keyword matching, and (iii) generating a combined relevance score based on both the semantic similarity and the textual analysis results;

(F) determining, based on the relevance of the initial response to the first request, whether the initial response is sufficiently relevant to the first request;

(G) in response to determining that the response is not sufficiently relevant to the first request, repeating (C)-(F) until the respondent provides a response that is determined to be sufficiently relevant to the first request.

2. The method of claim 1, further comprising performing (A)-(G) for each of the plurality of requests in the DRL, thereby generating data, in the data room, representing a plurality of responses to the plurality of requests.

3. The method of claim 1, wherein the first request comprises a request for an answer to a question, and wherein the initial response comprises an answer to the question.

4. The method of claim 1, wherein the first request comprises a request for a file, and wherein the initial response comprises a file.

5. The method of claim 1:
wherein the first request further specifies a required artifact;
wherein the initial response comprises an initial response artifact; and
wherein validating the initial response comprises validating the initial response based on the initial response and the initial response artifact.

6. The method of claim 1, wherein (E) further comprises assessing adequacy of the initial response based on the first request in the DRL.

7. The method of claim 1, wherein (E) further comprises assessing accuracy of the initial response.

8. The method of claim 1, wherein (C) comprises:
(C) (1) automatically identifying a recommended initial response to the first request in the DRL, comprising: converting text from the first request and potential response data into numerical vector representations using machine learning embedding techniques including at least one of TF-IDF, Word2Vec, or BERT, calculating cosine similarity between the vector representations to quantitatively assess semantic closeness, and selecting potential response data having similarity scores above a predetermined threshold;
(C) (2) providing output representing the recommended initial response to the first request in the DRL; and
(C) (3) receiving, from the respondent, input selecting the recommended initial response to the first request in the DRL.

9. The method of claim 1, further comprising:
(H) in response to a user request, securely deleting the DRL and the response that was determined to be sufficiently relevant to the first request.

10. The method of claim 1, wherein (C) and (D) are implemented using a dynamic chat-based user interface.

11. A system comprising at least one non-transitory computer-readable medium having computer program instructions stored thereon, the computer program instructions being executable by at least one computer processor to perform a method, the method comprising:

(A) receiving, by a data management system, a Data Request List (DRL) from a requestor, the DRL including a plurality of requests;

(B) storing the DRL in a data room accessible by a respondent;

(C) prompting the respondent to provide a response to a first request in the DRL;

(D) receiving an initial response from the respondent to the first request;

(E) validating the initial response to assess relevance of the initial response to the first request, comprising: (i) performing semantic analysis by converting the initial response and the first request into numerical vector representations using machine learning embedding techniques and calculating semantic similarity between the vector representations, and (ii) performing textual analysis using natural language distance calculations including at least one of string distance metrics or keyword matching, and (iii) generating a combined relevance score based on both the semantic similarity and the textual analysis results;

(F) determining, based on the relevance of the initial response to the first request, whether the initial response is sufficiently relevant to the first request;

(G) in response to determining that the response is not sufficiently relevant to the first request, repeating (C)-(F) until the respondent provides a response that is determined to be sufficiently relevant to the first request.

12. The system of claim 11, wherein the method further comprises performing (A)-(G) for each of the plurality of requests in the DRL, thereby generating data, in the data room, representing a plurality of responses to the plurality of requests.

13. The system of claim 11, wherein the first request comprises a request for an answer to a question, and wherein the initial response comprises an answer to the question.

14. The system of claim 11, wherein the first request comprises a request for a file, and wherein the initial response comprises a file.

15. The system of claim 11:
wherein the first request further specifies a required artifact;
wherein the initial response comprises an initial response artifact; and
wherein validating the initial response comprises validating the initial response based on the initial response and the initial response artifact.

16. The system of claim 11, wherein (E) further comprises assessing adequacy of the initial response based on the first request in the DRL.

17. The system of claim 11, wherein (E) further comprises assessing accuracy of the initial response.

18. The system of claim 11, wherein (C) comprises:
(C) (1) automatically identifying a recommended initial response to the first request in the DRL, comprising: converting text from the first request and potential response data into numerical vector representations using machine learning embedding techniques including at least one of TF-IDF, Word2Vec, or BERT, calculating cosine similarity between the vector representations to quantitatively assess semantic closeness, and selecting potential response data having similarity scores above a predetermined threshold;

(C) (2) providing output representing the recommended initial response to the first request in the DRL; and (C) (3) receiving, from the respondent, input selecting the recommended initial response to the first request in the DRL.

19. The system of claim 11, wherein the method further comprises:

(H) in response to a user request, securely deleting the DRL and the response that was determined to be sufficiently relevant to the first request.

20. The system of claim 11, wherein (C) and (D) are implemented using a dynamic chat-based user interface.

* * * * *